United States Patent [19]
Bowers

[11] 3,974,023
[45] Aug. 10, 1976

[54] METHOD FOR CONCENTRATION OF FOAMING LIQUIDS

[75] Inventor: Brian Bowers, Sarnia, Canada

[73] Assignee: Polymer Corporation Limited, Sarnia, Canada

[22] Filed: May 11, 1972

[21] Appl. No.: 252,410

[30] Foreign Application Priority Data
June 30, 1971 Canada .............................. 117045

[52] U.S. Cl. .................................. 159/49; 159/6 R; 159/DIG. 10
[51] Int. Cl.² .......................................... B01D 1/22
[58] Field of Search .............. 159/6, DIG. 10, 47 R, 159/45, 27 A, 27 B, 27 D, 13 A, 13 R, 49 R; 23/273 R

[56] References Cited
UNITED STATES PATENTS

| | | | |
|---|---|---|---|
| 2,696,248 | 12/1954 | Diamond .............................. | 159/6 R |
| 2,726,198 | 12/1955 | Lowman, Jr. et al. ............... | 202/236 |
| 2,915,489 | 12/1959 | White ................................. | 260/33.6 |
| 3,249,147 | 5/1966 | Gull .................................... | 159/13 R |
| 3,512,570 | 5/1970 | Ess et al. ............................ | 159/48 L |

FOREIGN PATENTS OR APPLICATIONS

| | | | |
|---|---|---|---|
| 897,844 | 4/1945 | France ................................ | 159/45 |
| 670,633 | 12/1938 | Germany ........................... | 159/27 A |

*Primary Examiner*—Jack Sofer
*Attorney, Agent, or Firm*—Stevens, Davis, Miller & Mosher

[57] ABSTRACT

Heat-sensitive, foamable liquids such as latex, are concentrated in a continuous process without foaming by feeding a heated liquid to a tubular evaporation chamber maintained at a reduced pressure where the liquid is adiabatically vaporized and forms an annularly flowing two-phase stream. The liquid and vapor phases are largely separated in the evaporation chamber by centrifugal forces acting on the stream. The final separation and isolation of the liquid phase is achieved in a separator consisting of a cyclone separator, a reservoir for the concentrated liquid and a settling chamber.

1 Claim, 3 Drawing Figures

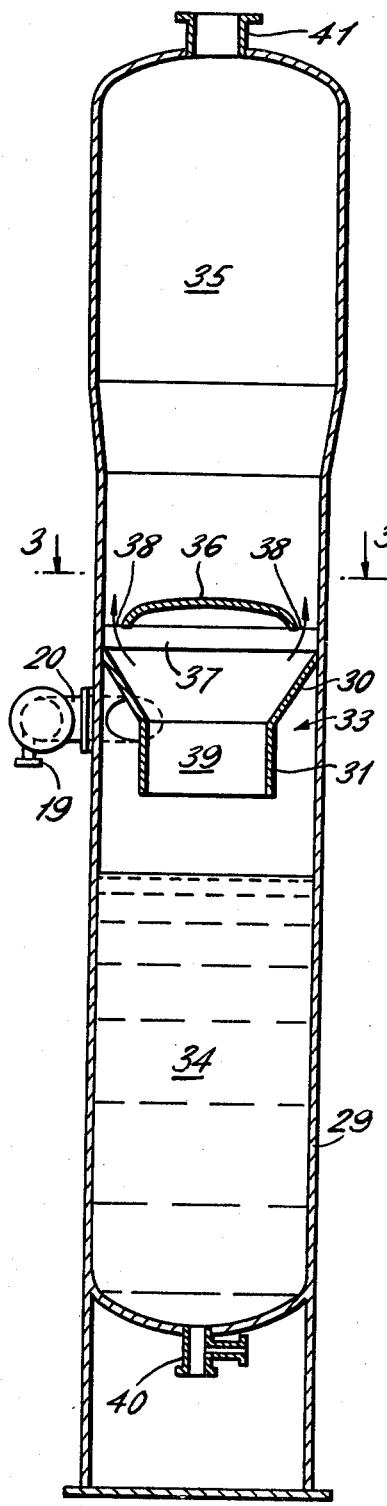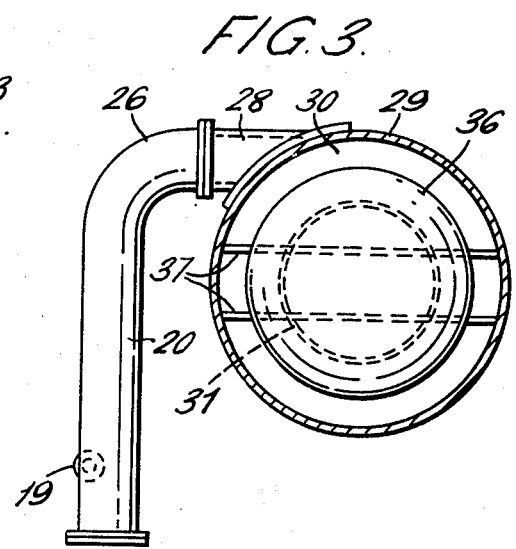

METHOD FOR CONCENTRATION OF FOAMING LIQUIDS

This invention relates to a method and to apparatus for concentrating solids-containing fluids, and more particularly to liquids which are heat-sensitive and tend to foam when a portion of their volatile constituents is vaporized, such as rubber latex, for example.

Of the several methods which can be employed to concentrate liquids of the class contemplated, such as centrifuging, creaming, filtration and evaporation, evaporative methods are still the most preferred. Processes using the evaporation principle vary, but modern commercial systems generally fall into the category of either "open" or "flash" systems. Open systems employ heat exchangers which allow free passage of the fluid material and unrestricted formation of vapor. The vapor is allowed to leave the liquid as it is generated and the material thus progressively concentrates through the system. The principal disadvantages of these systems are that foaming is uncontrolled and, particularly with heat-sensitive materials, heat-exchanger surfaces are prone to fouling.

Flash evaporation systems operate by heating the liquid material in a heat exchange zone at a pressure which prevents boiling and the formation of vapor. The heated material is then released as a spray or the like into an evaporation zone which is maintained at a lower pressure where rapid or "flash" evaporation takes place. Vapors are drawn from the evaporation zone and condensed. Although these "flash" systems are not so prone to fouling in the heating zone, precise control must be exercised to keep foaming and solids carry-over into the condensing system down to acceptable levels. In the case of heat-sensitive and foamable liquids, the above processes are plagued by frequent upsets in pressure and temperature and cannot be satisfactorily operated for extended periods of time.

It is, therefore, the primary object of the present invention to improve the concentration of heat-sensitive liquids. Another object is to increase the efficiency of the separation stage in an evaporation-type concentration process of foamable liquids by reducing the tendency of the liquid phase to foam and thereby reducing the entrainment of non-volatile material in the vapor phase. And yet another object of this invention is to provide an apparatus for concentrating such heat-sensitive liquids.

It has been discovered that if the evaporation stage in a flash evaporation process for the concentration of a material such as latex can be effected completely and stabilized in pressure and temperature before the separation stage, then foam formation is suppressed and consequently more efficient phase separation is achieved in a separator.

This invention provides an improved process for concentrating a heat-sensitive liquid which comprises:
A. vaporizing a stream of said liquid at a reduced pressure to form a two-phase stream consisting of a liquid phase and a vapor phase,
B. causing said two-phase stream to flow in a phase separating manner whereby the liquid and vapor phases are partially separated, and
C. separating said liquid phase from said vapor phase, said liquid phase being the concentrated heat-sensitive liquid. Advantages accruing from this include reduced fouling from the solids carry-over into the vapor condensation system and increased end-product recovery.

Other objects and advantages will be apparent from reading the following description taken in conjunction with the accompanying drawings in which like reference characters refer to like parts throughout the several views and in which:

FIG. 2, is an elevation of the evaporation tube and separator column in section showing the internal arrangement thereof; and FIG. 3, is a plan view, on a slightly enlarged scale, of the separator column in section taken along the line 3—3 in FIG. 2.

Figure 1:
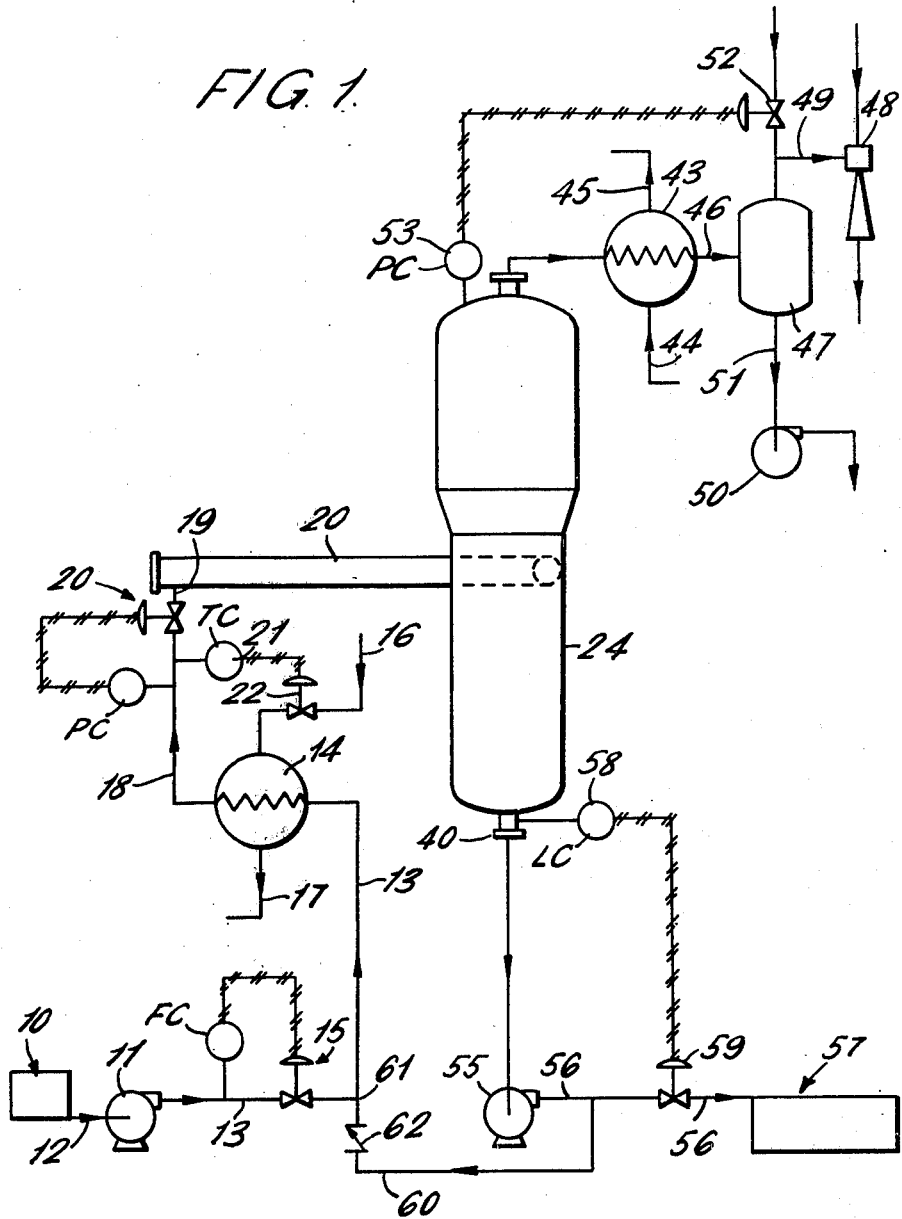
FIG. 1, is a diagrammatic arrangement of a concentration system according to the present invention.

Referring more particularly to FIG. 1, a source of liquid feed material to be concentrated such as synthetic rubber latex, for example, as indicated at 10. The feed source is connected to the inlet of a suitable pump 11 through a line 12. An outlet line 13 from the pump 11 to a heat exchanger 14 includes an automatic flow-control valve generally indicated at 15. The heat exchanger 14 may be of the well-known tube-and-shell type which is heated by steam entering through a line 16, and which leaves the heat exchanger through a line 17.

Heated material leaves the heat exchanger through a line 18 which, in the preferred embodiment, rises vertically to give a static head in the region of 20 feet, at an inlet point 19 to a horizontal cylindrical evaporation chamber 20. The temperature of the material to be concentrated in line 18 is controlled by a temperature controller 21 which controls the supply of steam to the heat exchanger 14 through a valve 22 in line 16. If the installation will not permit of a static head sufficient to give the required back pressure in the system to prevent boiling in heat exchanger 14 and line 18, then a pressure controller generally indicated at 23 is required in the line as shown in the drawings.

The evaporation chamber 20 and a separator column 24 will be best understood by referring to FIGS. 2 and 3. Evaporation chamber 20 is constructed from a tube eighteen inches in diameter having a closed end 25 and a straight run of about ten feet. It may be of a material such as stainless steel, or other material lined as with enamel, glass or an epoxy resin composition. Inlet point 19 adjacent closed end 25 is tangentially disposed to the chamber to impart a swirl to the incoming liquid. A 90° elbow 26 is formed in chamber 20 at an end remote from end 25 and connects by means of a flange joint 27 to a tangential adapter 28 on separator column 24 which forms an outlet zone of the evaporation chamber and an inlet to the separator column.

Separator column 24 of the preferred embodiment comprises a tall cylindrical shell 29 of 8 feet in diameter and some 43 feet high. Adapter 28, tangentially disposed to the shell, is situated substantially half-way up the column. Internally, a funnel-shaped baffle 30, having a wide, dependent neck 31, secured at its outer rim to the walls of the column just above adapter 28 by any known means such as welding, riveting or the like, defines with the walls of the column and adapter 28 a cyclone separator generally indicated at 33. At the same time, the baffle 30 divides the column into a lower reservoir 34 and an upper gravity settling chamber 35. A circular, convexly curved baffle 36 is supported in the mouth of the funnel-shaped baffle 30 in any convenient manner as by radial lugs or, as shown, by two parallel beams 37 spanning the inside of the column. Smaller in diameter than the column, baffle 36 defines therewith an annular opening 38 into settling chamber 35, which is slightly larger in area than the duct defined by neck 31. A liquid outlet 40 in the bottom of the reservoir 34 and a larger diameter vapor outlet 41 at the top of settling chamber 35 complete the essential structure of the separator column.

Vapor outlet 41 is connected by a large-diameter line to a condenser system indicated at 43. The condenser system may be of the quench tower type or tube-and-shell heat exchanger type as shown diagrammatically in FIG. 1. Whatever system is used, it will include a supply of cooling water 44 and a drain 45 therefor. A line 46 from the condensate outlet of the condenser 43 leads to a knock-out pot 47 through which the vacuum extending throughout the evaporation portion of the whole system is drawn by a conventional steam ejector system 48 through a line 49 from the pot. Condensate separates in the pot 47 from whence it is removed by a pump 50 through a line 51. Non-condensables pass out of the system through line 49 and then with the steam through the ejector system.

Vacuum in the system is maintained at the desired level by a pressure control valve which will admit atmospheric air to the pot 47 in response to a controller 53 which senses the pressure in the settling chamber 35.

A line from reservoir outlet 40 to the inlet of a pump 55 and a line 56 from the outlet of the pump removes concentrated product from reservoir 34 to a holding vessel 57. The desired level of liquid is maintained in chamber 34 by means of a sensor 58 in the chamber which monitors a flow control valve 59 in line 56. A portion of the concentrated liquid is recycled through the whole system by means of a line 60 from the outlet side of pump 55 at any convenient point ahead of flow control valve 59 to a junction 61 in line 13. To prevent any possibility of back-flow of diluted latex through line 60 and ultimately into the concentrated product holding vessel 57, a check valve 62 is placed in line 60.

The above apparatus can be used for the concentration of many types of heat-sensitive fluids containing non-volatile components, including highly foamable liquids. The representative examples of such fluids are solutions of sugars, soaps or other emulsifiers; solutions of polymeric materials in aqueous or non-aqueous media; emulsions and dispersions of fats, waxes or other hydrophobic materials such as milk, latex; and aqueous slurries of organic or inorganic materials. The operation of the apparatus will be illustrated by concentrating a synthetic rubber latex. The conditions of concentrating such as temperature, pressure, flow rate, position, shape and dimensions of the heat exchanger evaporation chamber and separator shown below were selected so as to optimize the production of the desired latex concentrate. Of course, other conditions would be required if either the feed material or the desired product was different.

The latex used in accordance with this invention was a dispersion in an aqueous medium of a butadiene-styrene copolymer containing about 25–30% of copolymerized styrene. It was stripped substantially free of volatile monomers and contained about 29–33% solids.

The latex was introduced into the system at a temperature of about 110°–130°F and pumped at a rate of about 30–45 U.S. gallons per minute through the heat exchanger 14 where it was heated to a temperature of about 130°–155°F into the evaporation chamber. The chamber was maintained at a high vacuum of about 0.6 psia, i.e. practically the same as in the separator column. The latex was vaporized adiabatically, i.e. practically without any heat transfer across the chamber walls and emerged at the outlet end of the vaporization chamber as a two-phase stream in which the phases were partially separated without foaming.

The heated latex issuing from inlet 19 immediately boils and swirls towards the outlet end of the chamber. The length of the chamber is selected so that at the operating conditions boiling is essentially complete and an equilibrium is established between the liquid and vapor phases by the time the outlet end is reached. The swirl of the two-phase fluid and the acceleration due to the rapidly expanding volume of said fluid moving down the evaporation chamber establishes an annular flow pattern with the heavier liquid phase flowing along the walls and the light vapor phase flowing down the middle of the tube-like chamber. Thus, a partial separation of phases is achieved before the two-phase fluid reaches the elbow 26 in the chamber. Further separation of phases takes place in the elbow 26 where a major portion of the liquid phase moves towards the outer boundary wall to initiate the centrifugal motion which takes place in the cyclone separator 33. As already stated, upon entry into the separator, vaporization is substantially complete and the temperature and pressure in the two-phase fluid have reached stabilization with respect to conditions prevailing in the separator 33 and reservoir 34. Within the separator, the greater part of the liquid phase is separated out by centrifugal force and coalesces by impingement upon the outer walls. Latex, now concentrated to a solids content of about 48%, runs down the walls and collects in the reservoir 34 where it is maintained at a level of about nine feet from the bottom, by means of the flow control valve 59 in the discharge line 56.

The vapor component of the fluid entering separator 33 first descends in a vortex into reservoir 34 and then reverses direction over the surface of the liquid to ascend through neck 31 and impinge upon the concave undersurface of baffle 36. Since this vapor still contains some droplets of liquid concentrate in suspension, many of these coalesce as they impinge upon the baffle. The vapor flow on around the baffle 36, through annular opening 38 and into the gravity settling chamber 35. Any further droplets of concentrated latex separating out in the gravity settling chamber run down the funnel-shaped baffle 30 and down the inner walls of neck 31 to the reservoir 34. Drips from the rim of baffle 36 take also the same path. The vapor entering the condenser 43 is substantially freed of liquid droplets and the condensate collected in the pot 47 is fit to be recycled or otherwise disposed of.

If it is desired to concentrate the latex to a higher solids level of above 50% or if the feed latex has a solids level of about 25% or less, the pumping rate is preferably reduced to a rate of about 20 U.S. gal./min. It may be desirable to mix the dilute latex such as obtained directly from the polymerization process with a concentrated latex which is at a lower temperature. The concentration process of this invention was carried out continuously in the above described apparatus for several months without encountering any problems with coagulum, equipment fouling or excessive carry-over of latex to the condensate knock-out pot.

The present invention has been described with particular reference to a preferred embodiment in apparatus and processing of a specific product. It will be obvious to those skilled in the art that various changes and modifications in both apparatus and process can be made for the processing of similar materials without departing from the spirit and scope of the invention.

What is claimed is:

1. An improved process for concentrating a heat-sensitive, liquid, foamable, aqueous dispersion of a nonvolatile organic material which comprises
   A. adiabatically vaporizing a heated stream of latex at a reduced pressure to form a two-phase stream consisting of a liquid phase and a vapor phase, causing said heated stream to pass through an elongated cylindrical evaporation zone under conditions designed to provide annular flow and equilibrium between the vapor and the liquid phase and suppress foaming and spray flow,
   B. subjecting the equilibrated stream of step (A) to centrifugal forces in the outlet end of said evaporation zone, and
   C. adiabatically separating said liquid phase from said vapor phase by further centrifugal and gravitational forces in a separation zone, said liquid phase being the concentrated latex and said vapor phase being substantially all evaporated water; wherein the latex is a latex of a rubbery polymer and it is heated to 130°–155°F and is fed to the vaporization zone at 30–45 U.S. gallons per minute and a vacuum of about 0.6 psia is maintained in the vaporization zone of which the diameter and length are 1.5 and 10 feet respectively.

* * * * *